United States Patent [19]

Coplan et al.

[11] 4,220,489
[45] Sep. 2, 1980

[54] METHOD OF FABRICATING A HOLLOW FILAMENT SEPARATOR MODULE

[75] Inventors: Myron J. Coplan, Natick; John H. Beale, Medfield; Robert B. Davis, Framingham, all of Mass.

[73] Assignee: Albany International Corporation, Menands, N.Y.

[21] Appl. No.: 956,032

[22] Filed: Oct. 30, 1978

[51] Int. Cl.² .......................... B65H 81/00; B32B 1/08
[52] U.S. Cl. .................................. 156/73.6; 156/166; 156/169; 156/250; 156/296; 210/321 R; 264/71; 264/138; 264/261
[58] Field of Search .............. 156/166, 169, 180, 433, 156/441, 296, 73.6, 172, 88, 250, 267, 269; 264/71, 72, 261, 263, 138, 143, 150, 159, 152; 210/321 B, 321 A, 321 R

[56] References Cited

U.S. PATENT DOCUMENTS

| | | | |
|---|---|---|---|
| 3,236,710 | 2/1966 | Curtiss | 156/180 |
| 3,769,127 | 10/1973 | Goldsworthy et al. | 156/180 |
| 3,825,639 | 7/1974 | Bulin | 264/72 |
| 4,038,190 | 7/1977 | Baudet et al. | 20/321 A |
| 4,105,731 | 9/1978 | Yamazaki | 264/261 |
| 4,123,304 | 10/1978 | Gaudette | 156/73.6 |

Primary Examiner—Michael W. Ball

[57] ABSTRACT

A hollow filament separatory module utilizing an annulus of semi-permeable hollow filaments with open ends encased in a potting compound and a collection chamber communicating with said open ends adjacent the potting compound with access surface means formed in the potting compound wherein the open ends appear, said filaments having ends thereof encapsulated by the introduction of potting medium into the interfilament interstices under the urging of vibratory energy and thereafter creating said open ends by cutting of ends and potting medium at a time in the curring cycle of the potting compound prior to its final cure.

2 Claims, 21 Drawing Figures

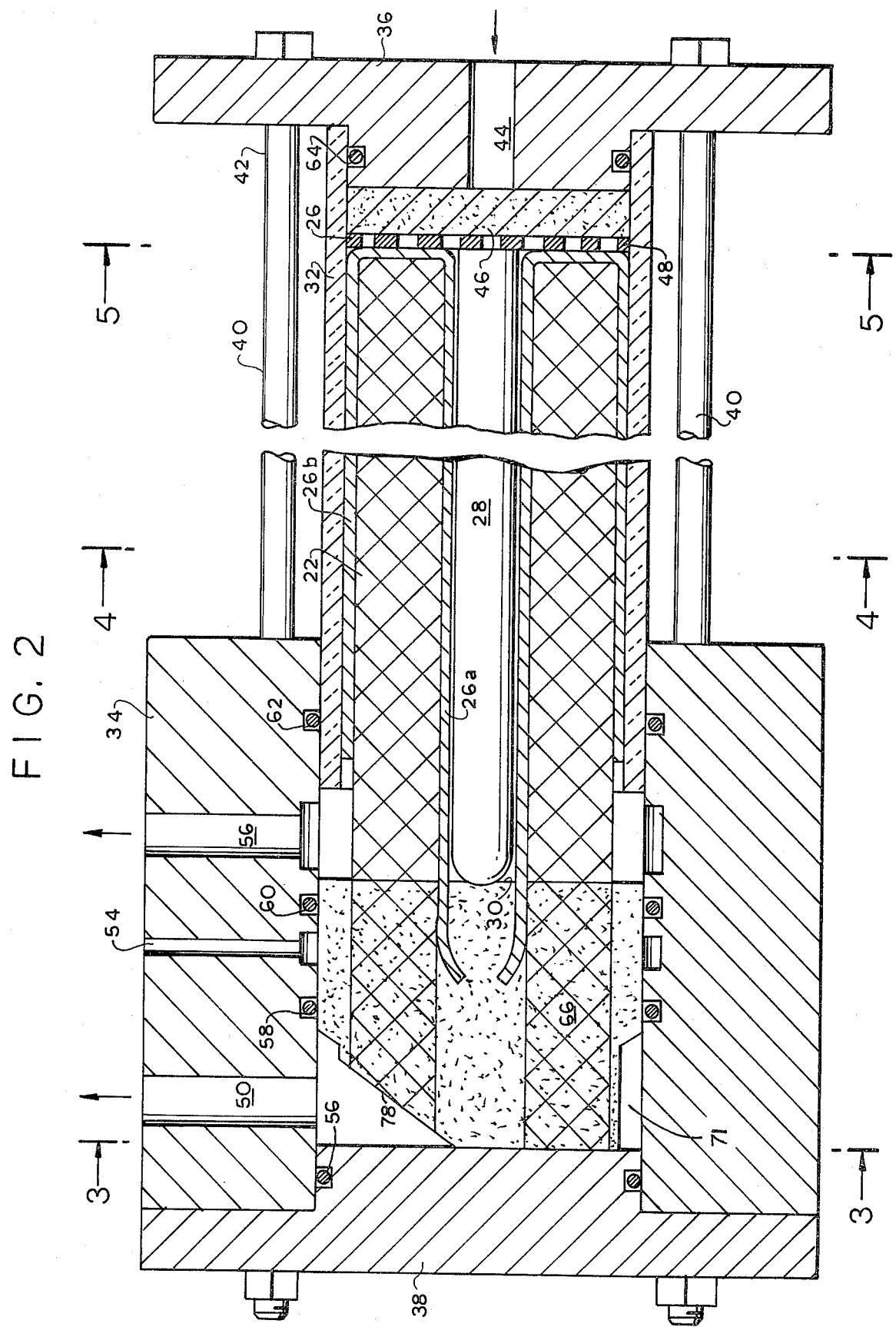

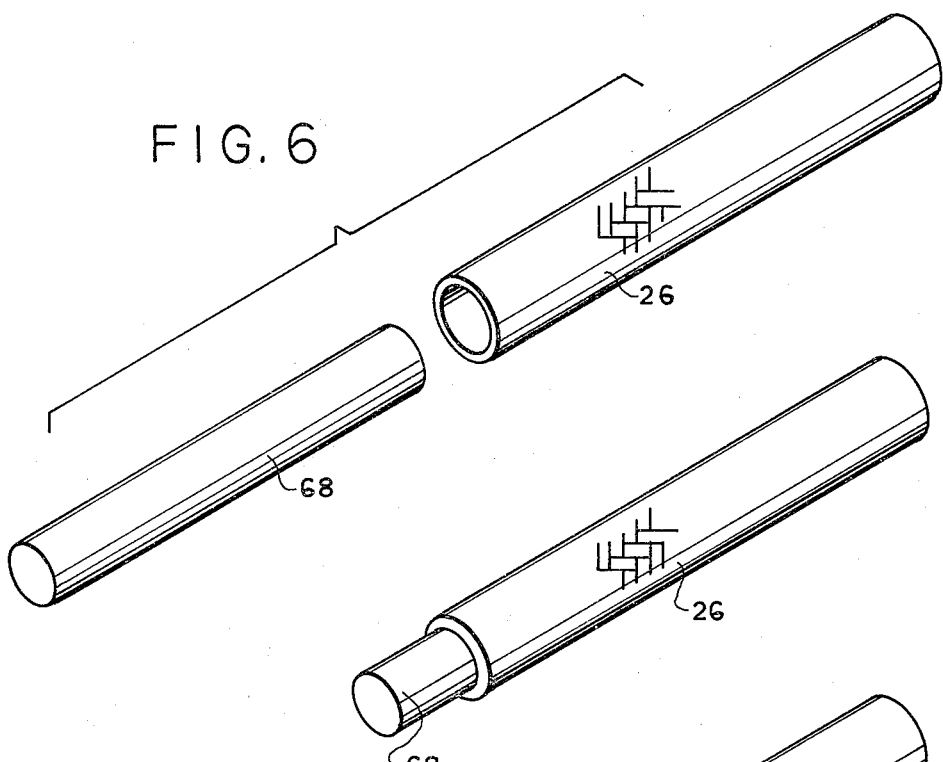
FIG. 6
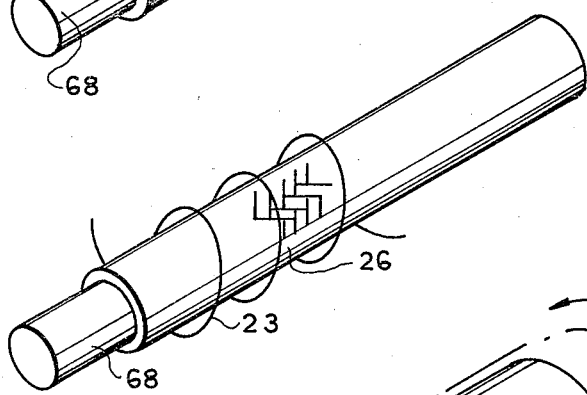
FIG. 7
FIG. 8
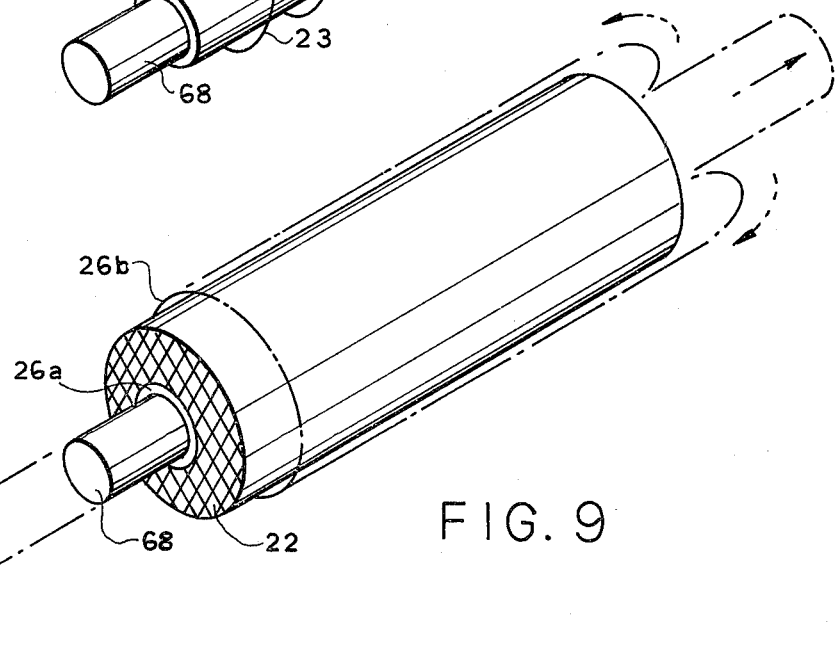
FIG. 9

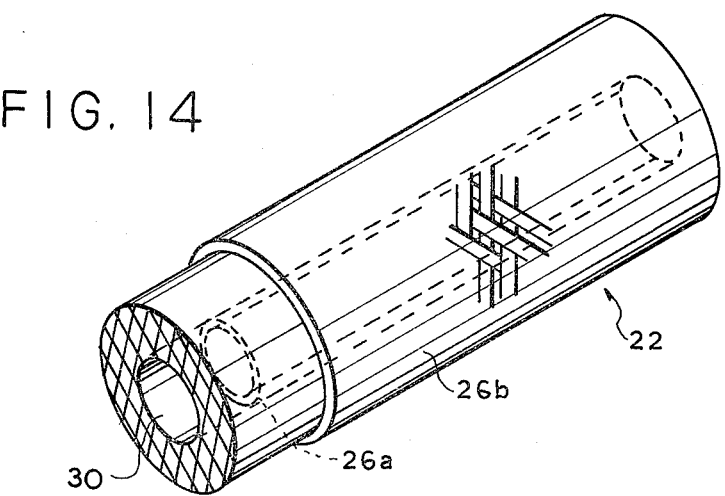
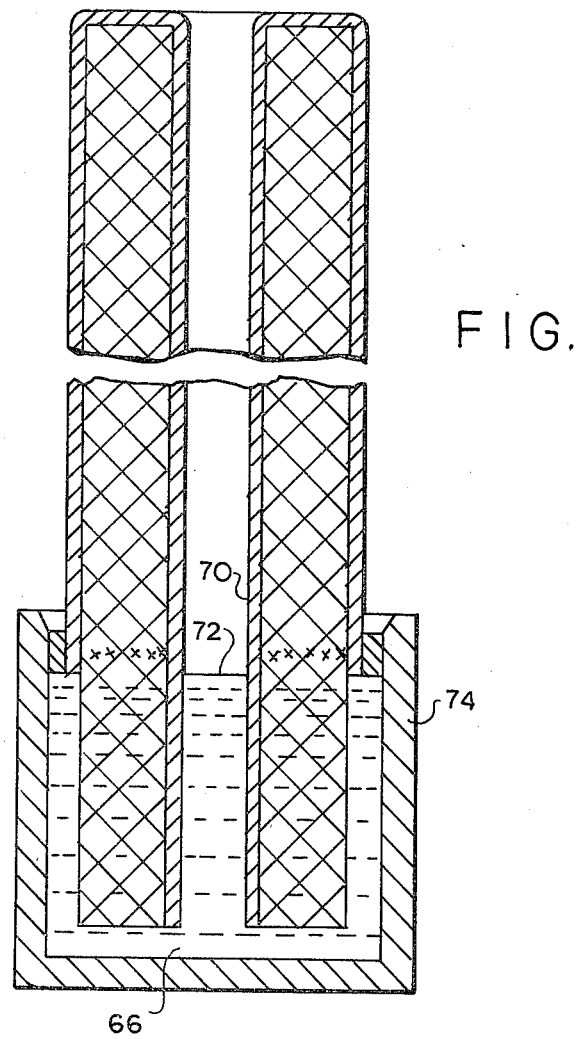

METHOD OF FABRICATING A HOLLOW FILAMENT SEPARATOR MODULE

BACKGROUND OF THE INVENTION

The use of membranes to effect separation of gas/gas, liquid/liquid, and liquid/solid mixtures and solutions has achieved general industrial applicability by various methods, among them being ultrafiltration, hyperfiltration, reverse osmosis, dialysis. In general, membrane elements associated with these processes are contained in vessels called modules, comprising a container having various inlet and outlet ports and an assembly of membranes within said container. The internal configurations are so arranged as to permit the introduction of a feed stream with or without pressure on the upstream face of the membranes, means for collecting permeate which passes through the membranes and emerges on their downstream faces, and means for keeping feed and permeate materials from commingling.

Membranes have been fabricated in various shapes, such as (1) flat sheets which may be supported in a typical plate and frame structure similar to a filter press; (2) flat sheets rolled into spirals with spacing materials interleaved with the membrane and the assembly sealed to provide spiroidal channels permitting the passage of a feed on one side of the coiled membrane through spaces to the opposite side of the membrane; (3) as tubes lining the inner surface of a reinforced braid, the braid itself at times being a component in a larger tube; and (4) in the form of open-ended hollow fibers so organized and sealed into header plates as to provide a separation of the flows over the external surfaces of the hollow fibers from any flow within the bores of the hollow fibers ensuing by virtue of passage of permeant across the membrane.

The subject invention is concerned with the use of hollow fibers assembled in modular form to provide the desired separation.

It has been commonly assumed that hollow fine fiber reverse osmosis modules are advantageously fabricated having an extremely high fiber packing density, combined with relatively small diameter fibers. Thus it has been considered desirable to provide a pressure vessel containing extremely high surface areas of membrane per unit volume of vessel. This feature is often presented as one of the principal areas of superiority for the hollow fiber system.

This arrangement inevitably contributes to a number of significant problems. First, it is relatively difficult to maintain uniform, extremely close packing among cylinders such as fibers unless they are quite parallel and uniform in diameter. In conventional hollow fine fiber modules, this condition is approached but not generally fully met. As a result, there is a distribution of packing densities of the fibers within the module so that some inter-fiber capillary channels may be essentially stagnated, and in other regions fiber spacing is wide enough to permit fairly ready passage of the pressurized feed solution. As a result, during operation different regions within the module are likely to present different flow conditions to the feed solution, resulting in variable conditions of transmembrane effective pressure, concentration polarization, and susceptibility to accumulation of deposits of adventitious particles or precipitated salts from the feed stream.

The problem of membrane fouling due to retention of suspended particles is also very prominent in conventional modules. Feed streams inevitably contain varying amounts of suspended particulate matter. Although extreme precautions are generally taken to prefilter the feed stream or otherwise remove the suspended particles prior to admitting the feed to the modules, the conventional hollow fine fiber modules ultimately become effective collectors for much of this material.

Tightly packed hollow fine fiber bundles develop occluded regions and lose effective membrane areas.

Apart from adverse shellside flow considerations such as described above, it can be shown that the parasitic pressure loss due to bore flow resistance is an exponential function of both fiber length and bore diameter. With relatively low intrinsic membrane transport capabilities, fairly fine fibers can be tolerated, but only up to a limit in length. However, where intrinsic membrane permeability is high (i.e., high flux at a particular applied pressure), the fiber length and bore diameter strongly influence pressure losses which may become a major limiting factor in module productivity.

These deficiencies, among others, of conventional tightly packed fine hollow fiber modules have heretofore prevented maximum utilization of the advantages to be gained by the use of hollow fibers in separatory applications.

SUMMARY OF THE INVENTION

This invention presents a new hollow filament separatory module and method of fabricating the same which includes unique features enabling the maximization of use of the attributes of hollow fibers for the purpose.

The invention contemplates fibers of selected diameters consistent with the flow requirements of high flux membranes. For example, by our methods we are capable of utilizing fibers with diameters as little as $100\mu$ to as much as $500\mu$ or more. The specific dimensions of length and diameter of fibers can be very important, depending upon the application. The present invention allows for easy selection of these dimensions. In reverse osmosis applications, we prefer fibers at least in the order of $250\mu$ in diameter. Additionally, by winding the fibers in a helical fashion with adjacent layers wound in opposite hand there is provided more uniform distribution of the channel spaces and surfaces of the fibers usable for separation.

Thus, while conventional teachings have considered 50-100 microns as the typical range of outside diameter for the hollow fine fiber membrane, we prefer the hollow fiber having diameters of 250 microns or larger. Indeed, in some cases we have made very successful use of fibers over 500 microns in outside diameter.

In this approach to the utilization of large and controlled ranges of diameter, we have used as a preferred embodiment a composite hollow fiber comprising a porous substrate, overcoated with a selected high filtration rejection barrier. Inasmuch as the intricacies of casting or coagulating an integral asymmetric system are obviated by the use of the composite arrangement, we are free to select fiber outside diameter, wall thickness, and rejective topcoat layer independently of one another, and thereby optimize the hydraulic and mechanical features, such as resistance to collapse under external pressure.

The module of this invention overcomes serious deficiencies in the prior art hollow fine fiber module design. One of these deficiencies which has been overcome largely relates to the methods of potting fibers into sealing tube sheets or end plates, and subsequently opening the fibers to provide exits from the individual fiber bores into the permeate collection chamber. Several separate approaches have been employed in the prior art. In two such approaches, the fibers sealed within the tube sheet are arranged much like a shell—and—tube heat exchanger. The open ends of the fibers are found on the face of the tube sheet opposite and generally parallel to the face of the tube sheet or sealing plate which is under hydraulic stress associated with the internal pressure of the modules. Support for the tube sheet, in one instance, is provided by a mechanical member in the form of a porous stone or similar porous element, against which the cut ends of fibers on the downstream face of the tube sheet come to rest. In the other general method, the downstream face of the tube sheet is freely suspended across the permeate collection cavity. Hydraulic pressure against the sheet is taken to ground by some means on the perimeter of the tube sheet. Among other ways, the perimeter is frequently machined or cast in tapered form, so that it may set into a matching taper; in other circumstances, the tube sheet has an extension parallel to the exposed face acting in the form of a flange.

In either case, the mechanical strength of the plate-like tube sheet member is adversely affected by the presence of a high concentration of fibers necessarily found therein. Frequently, the fibers are not entirely uniformly distributed and may be bonded in the tube sheet in certain regions very densely, and elsewhere less densely. Thus, although one might calculate a tube sheet thickness for a given free span, taking account of average fiber distribution, it is virtually impossible to avoid weakened regions in the tube sheet where the fibers are more tightly arranged.

In the case where the tube sheet is supported against a porous stone there may well be partial blockage of many fiber exits. In the case of the freely suspended tube sheet, there are the hazards of leakage or in fact occasionally total destruction due to the internal pressure of the module, which must be taken up by the sheet in cantilevered suspension.

In a third method, such as that described in U.S. Pat. No. 4,061,574, the fiber ends are encapulated in a potting medium and bores, generally perpendicular to the longitudinal axis of the bundle are drilled through the medium to reach the ends of at least one-half the fibers present. This technique has the disadvantage that it requires removal of an excessive amount of potting medium from the direction of thrust of the pressurization forces which the potting medium is provided to resist.

In the subject invention however there is provided, first, that the module internal pressure acting against the fiber potting medium is taken to ground by a surface of the fiber potting medium in which no cut fiber ends appear. Second, the surface of the potting medium which supports the thrust developed by the internal hydraulic pressure is generally at right angles to the principal axis of the module (i.e., generally parallel to the surface of the potting medium which faces inward to the pressurized region of the module). Third, cut ends of fibers which provide exit for the permeate flow appear in access surfaces within the potting medium at either a different elevation or a different angle than the surface of the potting medium required to take the pressurizing thrust force, or both.

A fourth feature of the technique of providing access surfaces disclosed herein is that the sum of areas of the projections of the access surfaces on a plane at right angles to the direction of thrust of the pressurization forces acting on the potting medium is substantially less than half of the cross-sectional area of any plane parallel thereto within the potting medium. This provision results in very little degradation in the compressive strength of the potting medium, in contrast to the condition prescribed in referenced U.S. Pat. No. 4,061,574, wherein by necessity at least 50% or more of the cross-section of the potting medium has been subjected to perforation by the bores called for in said teaching.

Another feature of the subject invention concerns the sealing of the pressurized concentrate regions of the module separate from the permeate collection regions of the module. In the prior art this is generally accomplished by means of "o"-rings or the like. Such "o"-rings or similar seals are generally hidden and cannot be viewed once the module is assembled. While they represent the only barrier to inadvertent mixing of concentrate with permeate, any leakage past them of pressurized concentrate into the permeate cannot be observed or overcome. In the subject invention the permeate collection region of the potting medium is sealed apart from the pressurized concentrate region of the potting medium by at least two "o"-rings with a weep-hole means for allowing any leak of concentrate past its "o"-ring seal to exit the module assembly without inadvertently commingling with the permeate.

Another feature of this invention solves problems present in conventional modules regarding the pressure losses associated with bore flow within a hollow fiber. It has been demonstrated that with inherently high flux membrane capabilities, unless due account is taken of fiber length and bore diameter, adverse results will occur. The results are an increase in percent salt passage and a decrease in the effective use of surface of the fiber in respect to the nominal "zero"-length flux. In effect, both flux and rejection are diminished when fibers are "too long" relative to their bore size and inherent permeation rate.

Examples of the adverse effect of excessive fiber length are provided below, shortly. It should be noted that it is possible to use hollow fibers in reverse osmosis either with the bore open at one end and sealed at the other, or with the bore open at both ends. In the former case, the open fiber end is sealed in a mass of potting medium and its bore discharged into a low pressure permeate collection zone or chamber. The closed end may be potted into a resin mass or the like to help support one end of the bundle of which the fiber is a member.

In the case of both bore ends open in each fiber length, both ends of the fiber must be sealed in a potting medium in such a way that the bore discharge exits into low pressure permeate collection zones or chambers. The two ends of any one fiber may appear in the same mass of potting medium and each bore exit may discharge to the same collection zone, or the fiber may be potted in such a way that each bore exit discharges into a separate collection zone.

Generally, when both open ends appear in the same mass of potting medium and the bore exits discharge into the same collection zone, the length of fiber between the cut ends comprises some form of loop. The loop may be of simple fairly straight-legged hairpin shape, or it may follow a more intricate spatial path in two or three dimensions. However, if each fiber end is potted in separate masses, the fiber shape between the cut ends conceivably could be quite straight or could follow an infinite variety of either random or geometrically organized paths.

We generally prefer to arrange our fibers in helical paths, the axes thereof being congruent and parallel to the principal direction of flow of the pressurized feed. The cut fiber ends may be sealed into the same mass of potting medium and discharge into a common chamber, or they may be sealed into two separate masses of potting medium, and discharge into two separate zones, generally at opposite ends of the axis of the fiber helix.

For purposes of considering the examples illustrating the adverse effect of fiber length on bore flow effects, the actual path shape of each fiber need not be considered. It is important however to take numerical account of the consequence of operating with one sealed end versus both ends open. In the sealed-end case, it is obvious that flow within the fiber bore can only be from the sealed end toward the open end. In the two-ends-open case, flow within the fiber bore is bi-directional with respect to some point or zone along the fiber path. That is to say, there must be a stagnation point or region in the bore corresponding to the sealed end of the one-end-open case; bore flow on one side of said point or zone will be toward the bore exit at the one cut end, while bore flow on the other side of said zone will be toward the bore exit at the other cut end. Thus, a position approximately half-way along the path between the ends of a two-end open fiber corresponds to the sealed end of a one-end open fiber.

Reference is made herein to a length, L, as the path length between the cut ends of double-open-ended fiber. It should be borne in mind that for single-open-end cases the fiber length from cut to open end ordinarily corresponds to one-half of a length associated with a two-end-open case. The corresponding set of fiber properties and module operating conditions will result in limits on length from cut end to sealed end essentially one-half that allowable for the path length between the ends of a two-open-end configuration.

We prefer to employ in our system fibers with both ends open. We have found that there is a unique relationship between various geometric and hydraulic features of the module and its operation that must be met to achieve superior results in module productivity and the rejection qualities of the permeate. Thus, we provide in our method that the path length between the open ends of each fiber must not exceed a certain value, "$L_{crit}$", (in cm.) which depends upon the variables: fiber O.D., fiber I.D., effective driving pressure, and fiber inherent flux at said pressure. According to our design, we limit the length of the path between the cut open ends according to the following equation:

$$L_{crit} = \sqrt{\frac{(P - \Delta\pi) \times (ID)^3 \times (R)}{50F}}$$

where:

P = Module inlet feed pressure in $Kg/cm^2$
$\Delta\pi$ = Osmotic pressure difference between feed solution and permeate in $Kg/cm^2$
ID = Filament internal diameter in microns ($\mu$)
R = Ratio of filament inside diameter to outside diameter
F = Flux of filament based on its outside diameter at the effective operating pressure, expressed as a velocity of microns per second ($\mu$/sec.).

The operation of this relationship will be illustrated in several following examples. In each instance a group of fibers was formed into a loop, and the legs of the loop of fibers sealed in a potting medium and open ends of fiber exposed all on one side of said medium. The lengths of fiber loop on the opposite side of the medium were mounted inside pressure tubing and subject to flowing feed of salt solution under pressure. The length of loop, L, was taken as the overall distance from one cut end to the other cut end of the fiber, substantially all of said length being within the pressurized feed zone, and a relatively inconsequential amount comprising the length of fiber in the potting medium. A slight correction might be made for the so-called "inactive length" of fiber sealed in the potting medium. It will be recognized by one familiar with the art, however, that this length represents a small fraction of the "active length" of fiber. Correction for the portion of "inactive length" is quantitatively unimportant when the ratio inactive length/active length is about 0.1 or less; for all practical cases this requirement is easily met.

All the fibers employed in the examples below were a composite of polysulfone substrate with a rejection barrier of sulfonated polyfuran resin. The outside diameters were all 250$\mu$ and inside diameters 80$\mu$ (within tolerances of $\sim \pm 5\mu$). The several samples were selected to cover a fairly wide range of flux and rejection properties.

Each sample was prepared with different end-to-end lengths. Each sample was tested for permeate flux and rejection of 2000 ppm NaCl solution at 58 $Kg/cm^2$ applied pressure down to as low as 14.5 $Kg/cm^2$ applied pressure (200 psi). The osmotic pressure ($\Delta\pi$) of the feed is taken as 1.4 $Kg/cm^2$.

The flux and rejection of each fiber sample were measured at each of three fiber lengths and comprise the experimental data appearing in Tables IA and IB. Flux was plotted vs. length as shown in Plates 1 and 2. Fairly reliable extrapolations to "zero" length flux were made on these plots and are included in parentheses in the tabulated property values shown in Tables IA and IB. Included also in the Table are the values of $L_{crit}$ calculated by use of Equation (1) for each fiber sample and operating pressure. Using these several calculated values of $L_{crit}$, the ratio of $L/L_c$ for each sample length was calculated and are also presented in the Table. Rejection is calculated in the conventional fashion, R = 100 (1-salt conc. permeate/salt conc. feed). Flux is presented both as gallons per sq. ft. per day (gfd) and the velocity parameter, microns per second ($\mu$/sec.). These are related by 1 gfd = 0.466 $\mu$/sec. The ratio of flux at any given length to "zero"-length flux, $F/F_o$, is also tabulated.

TABLE 1

Flux and Rejection vs. Fiber Length

| A. Several Different Fiber Samples at One Pressure, $P - \Delta\pi = 56.7$ Kg/cm² | | | | | | B. One Fiber Sample, 2367-5-4, at Several Pressures | | | | | |
|---|---|---|---|---|---|---|---|---|---|---|---|
| L (cm) | L/$L_c$ | Flux (gfd) | Flux (μ/sec) | $F/F_o$ | Rej. (%) | L (cm) | L/$L_c$ | Flux (gfd) | Flux (μ/sec) | $F/F_o$ | Rej. (%) |
| SAMPLE 2292-14-2, $L_{crit}$ = 173 cm. | | | | | | $P - \Delta\pi = 13.1$ Kg/cm², $L_{crit}$ = 108 cm. | | | | | |
| 0 | 0 | (13.6) | (6.3) | — | — | 0 | 0 | (8.2) | (3.8) | — | — |
| 43 | .24 | 13.3 | 6.2 | .98 | 99.0 | 41 | .38 | 8.0 | 3.7 | .98 | 97.1 |
| 182 | 1.05 | 12.1 | 5.6 | .89 | 98.3 | 82 | .76 | 7.6 | 3.5 | .93 | 96.6 |
| 365 | 1.99 | 9.2 | 4.3 | .68 | 92.8 | 123 | 1.14 | 6.2 | 2.9 | .76 | 96.5 |
| SAMPLE 2292-14-3, $L_{crit}$ = 121 cm. | | | | | | $P - \Delta\pi = 20.3$ Kg/cm², $L_{crit}$ = 113 cm. | | | | | |
| 0 | 0 | (28.2) | (13.1) | — | — | 0 | 0 | (11.3) | (5.3) | — | — |
| 44 | .36 | 27.1 | 12.6 | .96 | 99.1 | 41 | .36 | 11.1 | 5.2 | .98 | 97.7 |
| 178 | 1.47 | 21.5 | 10.0 | .76 | 98.9 | 82 | .73 | 10.1 | 4.7 | .89 | 97.8 |
| 362 | 2.99 | 12.5 | 5.8 | .44 | 89.7 | 123 | 1.09 | 8.7 | 4.1 | .77 | 97.2 |
| SAMPLE 2292-6-3, $L_{crit}$ = 170 cm. | | | | | | $P - \Delta\pi = 34.9$ Kg/cm², $L_{crit}$ = 118 cm. | | | | | |
| 0 | 0 | (14.4) | (6.7) | — | — | 0 | 0 | (18.1) | (8.4) | — | — |
| 41 | .24 | 14.0 | 6.5 | .97 | 99.4 | 41 | .35 | 17.7 | 8.2 | .99 | 98.5 |
| 122 | .68 | 11.5 | 5.4 | .80 | 99.1 | 82 | .69 | 17.0 | 7.9 | .94 | 98.5 |
| 183 | 1.08 | 10.3 | 4.8 | .72 | 97.8 | 123 | 1.04 | 14.2 | 6.6 | .79 | 97.8 |
| SAMPLE 2292-2-1, $L_{crit}$ = 230 cm. | | | | | | $P - \Delta\pi = 42.1$ Kg/cm², $L_{crit}$ = 120 cm. | | | | | |
| 0 | 0 | (7.7) | (3.6) | — | — | 0 | 0 | (20.7) | (9.7) | — | — |
| 40 | .17 | 7.6 | 3.5 | .99 | — | 41 | .34 | 20.5 | 9.6 | .99 | 98.6 |
| 127 | .55 | 6.8 | 3.2 | .88 | 98.6 | 82 | .68 | 20.0 | 9.3 | .97 | 98.7 |
| 181 | .79 | 6.9 | 3.2 | .90 | 98.9 | 123 | 1.03 | 16.6 | 7.7 | .80 | 98.2 |
| SAMPLE 2367-5-4, $L_{crit}$ = 122 cm. | | | | | | $P - \Delta\pi = 49.4$ Kg/cm², $L_{crit}$ = 120 cm. | | | | | |
| 0 | 0 | (27.4) | (12.8) | — | — | 0 | 0 | (24.5) | (11.4) | — | — |
| 41 | .33 | 26.8 | 12.5 | .98 | 98.7 | 41 | .34 | 24.1 | 11.2 | .98 | 98.6 |
| 82 | .67 | 25.6 | 11.9 | .93 | 98.9 | 82 | .68 | 22.1 | 10.5 | .92 | 98.7 |
| 123 | 1.01 | 22.0 | 10.2 | .80 | 97.8 | 123 | 1.03 | 19.6 | 9.1 | .80 | 98.0 |

The data in Table I clearly indicate that both flux and rejection decline with increasing length of fiber, L. A consistent analysis of the effect of L on flux appears in Plate 3, where the ratio of flux at any length to "zero"-length flux ($F/F_o$) is plotted against the ratio of the fiber length under test, L, to the critical fiber length, $L_c$, calculated according to Equation 1, ($L/L_c$). The points are clearly distributed in such a way that the graph can be partitioned into four quadrants by a vertical line corresponding to $L/L_c=1$ and a horizontal line corresponding to $F/F_o=0.88$. At values of L less than $L_c$, the flux is 87.5% of the "zero"-length flux or greater for all but 1 of 15 points; at values of L greater than $L_c$, the observed flux is 83% of the "zero"-length flux or less for 7 or 8 points. When L is as great as 2 to 3 times $L_c$, the experienced flux can fall to as little as 40%–50% of the "zero"-length flux.

The effect of length on rejection shown in Table I is also represented in Plate 4 for several of the samples. For this plot, the value % Salt Passage is used and found from: Salt Passage=(100%-% Rejection). The % Salt Passage is plotted against the ratio $L/L_c$ in Plate 4. It will be seen that as L increases toward $L_c$, % Salt Passage rises only a few tenths of a percent, but at $L/L_c=1$, % Salt Passage starts to rise fairly rapidly.

It will be seen, therefore, that the critical end-to-end length, $L_c$, calculated through the Equation set forth above can be used as a practical criterion for preserving both a high percentage of "zero"-length flux and the superior salt rejection properties attendant therewith. In a corollary sense, contructing modules with fibers of end-to-end length greater than $L_c$ should be avoided, since there is both a fairly significant loss of permeate production efficiency as well as a degradation in permeate quality that can become intolerable. The exact value of $L_c$ does not, however, always determine an absolute boundary of acceptable performance. It might well be that "zero"-length flux and rejection values are so favorable that a flux efficiency of somewhat less than 0.85 could be tolerated along with a few percent increase of salt passage. In recognition of this, we use limits of ±10% around $L_c$ for practical module fabrication.

In the preferred method of preparing fiber bundles according to the present invention, the hollow fibers are wound continuously in alternating helices starting on a small diameter shaft, building an annular bundle. The path length of fiber forming a helix from one end of the bundle to the other is a function of the radial position of the fiber in the annulus and its helix angle. Therefore, unless appropriate adjustments are made in the relative speed of rotation of the winding shaft and the end-to-end traverse speed of the bundle of filaments during the winding, there will be a continuously increasing length of fiber in any pass between the two ends of the bundle as the radial position increases. The changes can result in as much as a several-fold increase in the length of the helix or more. Perhaps in some conditions as much as 6- to 10-fold. Thus, if the length of helical loop from one end to the other has been determined for optimum flux and rejection, and the initial winding on the mandrel were to accomplish that optimum length, the external wraps in the annulus would be far in excess of the desired length. By selecting precalculated limits for the specific ratio of the rotational velocity of the winding mandrel and the reciprocating traverse mechanism, helices can be laid at selected radial positions in the annulus varying very slightly in respect to their length. For example, a helix length from the innermost to the outermost regions of the annulus never varying more than 10% around the optimum length can be achieved.

One might assume that this condition could be achieved by having a continuously decaying ratio of the rotational velocity of the mandrel to the traverse speed. But this leads to other problems obviated by our invention. It can be shown that at selected ratios of the rotational and traverse speeds the helix winds will build explicity on top of one another thereby forming ridges. These ratios are unavoidable in any monotomically declining scheme. The result of the ridges is to build an annular package of helices having hills and valleys which are never properly filled as winding proceeds. In our method, we avoid this problem by selecting a series of discrete ratios of the winding and traverse rates and changing from one ratio to the next during the winding at predetermined annular positions.

It is another feature of our invention that the annular bundle of helices is self-supporting. Whereas the prior art describes in some instances helical bundles, these are generally firmly and permanently associated with the winding shaft or tube originally comprising the mandrel surface. Contrary to that, we have found superior results in both the winding and subsequent handling of the fiber bundle preparatory to potting and the like, by the use of a collapsible expansible sleeve as the surface immediately upon which the first wraps of the bundle are wound. This sleeve may be a braided tube of yarn, for example. Said sleeve is secured over the winding shaft for a distance greater than the axial length of the annulus for support of the inner surface of the annulus. An additional length of the expansible sleeve sufficient to provide a continuous protective surface for the external fibers of the annulus, rolled around one end of the annulus, it also carried on the winding shaft.

Another feature of our invention relates to the method of encapsulating one end of the annulus in what has been referred to as the potting medium. The art of casting fibrous and other materials into a common matrix is well known and referred to as "potting". It is also well known to select potting compounds of which epoxies are but one example, so that their compatibility with fibers or other materials to be encapsulated makes for intimate bonding in the interfaces between the fibers or particles, and the encapsulating medium. Thus, in the case of the hollow fibers to be sealed in said potting medium, it would be most desirable that the fiber surfaces be wet well by the potting medium in its prepolymerized fluid form. As a natural consequence of good wettability of the fibers by the potting compound before it is cured, there will be a tendency for the potting compound in its precured state to migrate by capillarity among the fibers, perhaps to considerable distances beyond the position where it would be useful for the cured potting compound to be. In the potted fiber bundle this would lead to occlusion and loss of membrane surface of some of the fiber, possible pockets of unsealed regions, and unnecessary utilization of epoxy compound. We have overcome these limitations in our method of winding the fibers. First we apply a ring of rubbery cement to the extensible sleeve member on the winding shaft at a position that will correspond ultimately to the upper regions of the potting medium. Then during the winding of the fibers on first the extensible sleeve and subsequently on top of the preceding fiber wraps, we apply a continuous deposit of the same rubbery cement at generally the same axial position in the annulus. At the completion of the winding of the entire annulus, there exists within it a barrier membrane of the rubbery cement separating the portion of the fibers which will ultimately become embedded in the potting medium from the remainder of their lengths. In the same sense, the extensible sleeve member is likewise encapsulated in this barrier membrane, so that if it too has a capability for inducing capillary migration of the precured potting medium, said capillarity would be obstructed at the same axial point or position.

In the typical prior art hollow fine fiber module the pressure shell has been a cylindrical chamber capable of sustaining the necessary high hydrostatic pressures. The requirement has been imposed on this shell to accept both the hoop stress loadings and axial loading developed by connections to the end plates. In addition, the end plates are frequently mounted to the shell and connected by snap rings or the like, which carry the thrust on the end plates to the shell surface itself through grooves or some other connective ridges or the like. These several features require that the shell be of substantial thickness and mechanical integrity in all directions. In our invention, we have provided mechanical means in the form of stringer bolts or the like securing the two end plates of the pressure cylinder to one another, which eliminate all axial stress on the shell. By use of these stress-bearing stringer members, we also eliminate problems associated with fixing end plates to the shell by snap rings and the like, as referred to. These features allow for rather simpler fabrication of the shell itself and the assembly and disassembly of the entire system, as well as access to its internal parts.

BRIEF DESCRIPTION OF THE DRAWINGS

In the accompanying drawings:

FIG. 2 is a partially sectional longitudinal view of the module shown in FIG. 1 taken along the line 2—2 in the direction of the arrows therein;

FIG. 6 is an exploded perspective view of cylindrical winding support shaft and collapsible expansible sleeve about which hollow filaments are wound during the fabrication of the fiber bundle of the module shown in FIG. 1;

FIG. 7 is a perspective view of the support shaft with the sleeve in position thereon prior to winding;

FIG. 8 is a perspective view of support shaft and sleeve with the fiber helix being wound thereon to provide the fiber bundle;

FIG. 9 is a perspective view illustrating removal of the support shaft and stretching and folding of the sleeve after completion of the winding of the bundle;

FIG. 14 is a perspective view illustrating the relative positions of bundle annulus and collapsible, expansible sleeve in the completed bundle;

FIG. 15 is a partially sectional longitudinal view of the completed bundle positioned in a mold during the potting operation wherein an end of the annular bundle of fibers is encapsulated;

DESCRIPTION OF THE PREFERRED EMBODIMENT

Figure 1:
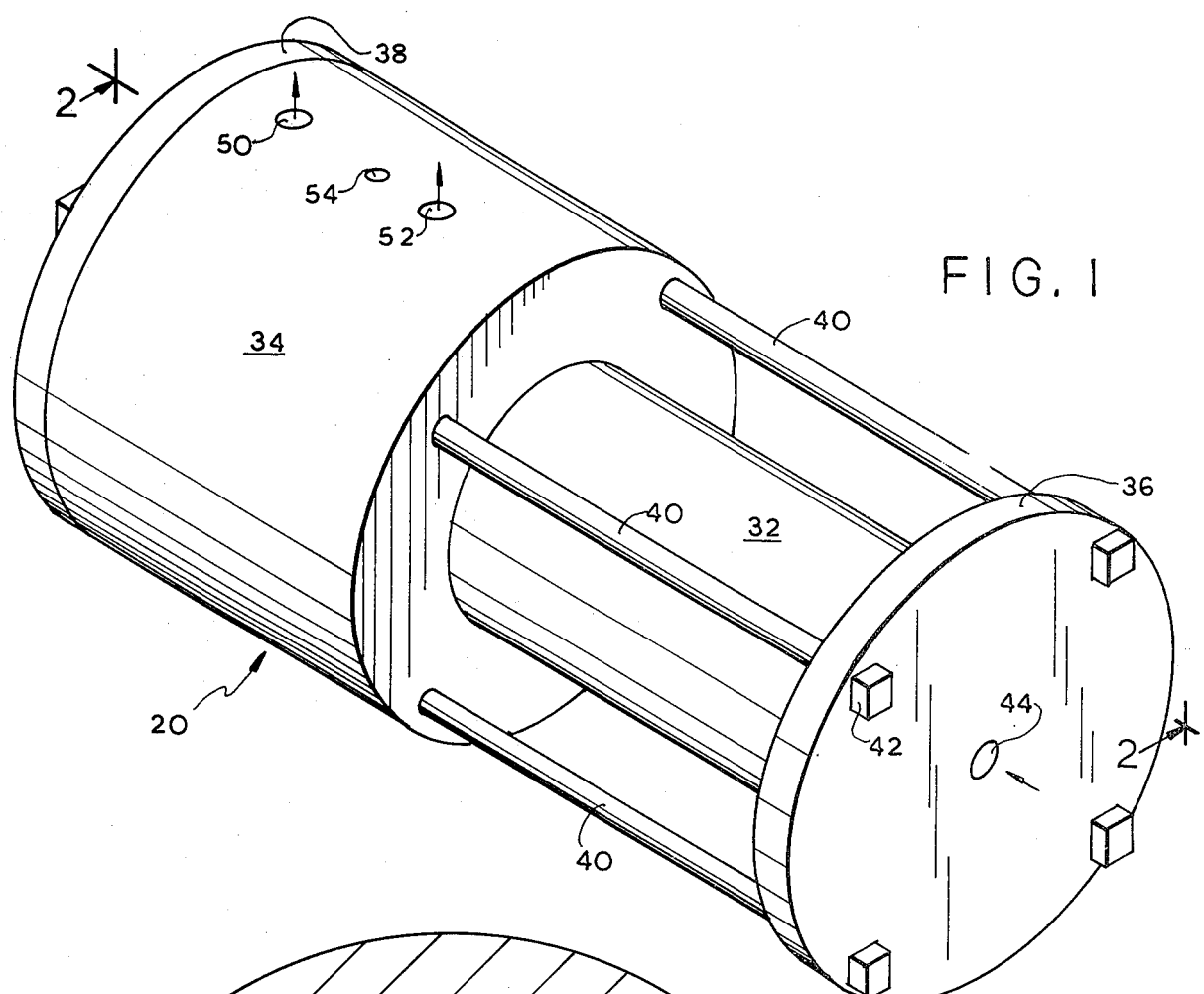
FIG. 1 is a perspective view of a hollow filament separatory module constructed in accordance with the teachings of this invention.

A module constructed in accordance with the teachings of this invention is designated in the Figs. generally by the numeral 20. The module in completed form is seen in FIGS. 1-5 and includes an annulus 22 formed of wound permeable hollow filaments and braid sleeve 26 folded over to sandwich the filaments for the most part between inner and outer sleeve sections 26a and 26b with solid rod 28 projecting within and occupying the annulus core 30.

The specific manner in which the annulus is wound is described in detail below. The fibers which are of relatively large diameter are wound in helical fashion with adjacent layers wound in opposite hand. There is relatively uniform distribution of the large diameter fibers and the channel spaces and surfaces of the fibers usable for separation. In the preferred embodiment the hollow fibers are 250 microns or greater in outside diameter. In certain applications 500 microns outside diameter is preferred. Although any suitable hollow fiber can be used, the preferred embodiment contemplates a composite hollow fiber comprising a porous substrate, overcoated with a selected high filtration rejection barrier.

The annulus 22 is encased within pressure resistant shell 32 and pressure sleeve 34 between end plates 36 and 38 held in position by stringers 40 passing through holes 42 formed in the end plates. Axial feed-in port 44 is provided in end plate 36 to allow the fluid which is being operated upon to wash the outside of the fibers 22 after passing through prefilter 46 and perforated disk 48. In certain applications either or both prefilter 46 and disk 48 can be omitted. In the preferred embodiment prefilter 46 is a felt structure through which the liquid can pass and disk 48 is a rigid plastic member.

The pressure sleeve 34 is provided with radial ports 50 and 52 which respectively provide outlets for permeate and concentrate. Port 54 functions as a weep hole. Suitable O-rings 56, 58, 60, 62 and 64 are provided. The end of annulus 22 within pressure sleeve 34 is encased in potting compound 66 as will be described below.

The manner of winding annulus 22 is seen in FIGS. 6 through 14. Collapsible expansible braided sleeve 26 is secured over suitable winding shaft 68 for a distance greater than the axial length of the annulus to support the inner surface of the annulus. This is the surface immediately upon which the first wraps of the bundle 22 are wound. An additional length of expansible sleeve sufficient to provide a continuous protective surface for the external surface of the annulus, rolled around one end of the annulus, is provided.

In the preferred method of preparing fiber bundles according to the present invention, the hollow fibers are wound continuously in alternating helices starting on a small diameter shaft, building an annular bundle. As stated above, the path length of fiber forming a helix from one end of the bundle to the other is a function of the radial position of the fiber in the annulus and its helix angle. Therefore, unless appropriate adjustments are made in the relative speed of rotation of the winding shaft and the end-to-end traverse speed of the bundle of filaments during the winding, there will be a continuously increasing length of fiber in any pass between the two ends of the bundle as the radial position increases. The changes can result in as much as a several-fold increase in the length of the helix or more. Perhaps in some conditions as much as 6- to 10- fold. Thus, if the length of helical loop from one end to the other has been determined for optimum flux and rejection, and the initial winding on the mandrel were to accomplish that optimum length, the external wraps in the annulus would be far in excess of the desired length. We select pre-calculated limits for the specific ratio of the rotational velocity of the winding mandrel and the reciprocating traverse mechanism, and lay down helices at selected radial positions in the annulus varying very slightly in respect to their length. For example, a helix length from the innermost to the outermost regions of the annulus never varying more than 10% around the optimum length is preferred and readily achieved.

A series of discrete ratios of the winding and transverse rates is selected and changed from one ratio to the next during the winding at predetermined annular positions thus avoiding the building up of hills and valleys.

In the Figs. the first layer of helical winding by way of example is indicated by the numeral 23, a second by the numeral 24 and a third by the numeral 25, there being adjacent intermediate unindicated windings wound in opposite hand.

This solves problems present in conventional modules regarding the pressure losses associated with bore flow within a hollow fiber and takes into account fiber length and bore diameter. This avoids an increase in percent salt passage and a decrease in the effective use of surface of the fiber in respect to the nominal "zero"-length flux and flux and rejection are not diminished because fibers are "too long" relative to their bore size and inherent permeation rate.

Upon completion of the winding operation the outer end 26b of the braid is wrapped over the annulus 22 with the inner end 26a of the braid left within and the mandrel 68 removed exposing bore 30.

After winding, one end of annulus 22 is encapsulated in potting medium 66. The art of casting fibrous and other materials into a common matrix is well known and referred to as "potting". It is also well known to select potting compounds of which epoxies are but one example, so that their compatibility with fibers or other materials to be encapsulated makes for intimate bonding in the interfaces between the fibers or particles, and the encapsulating medium. Thus, in the case of the hollow fibers to be sealed in the potting medium 66 it would be most desirable that the fiber surfaces be wet well by that time. As a natural consequence of good wettability of the fibers by the potting compound before it is cured, there will be a tendency for the potting compound in its precured state to migrate by capillarity among the fibers, perhaps to considerable distance beyond the position where it would be useful for the cured potting compound to be. In the potting this would lead to occlusion and loss of membrane surface of some of the fiber, possible pockets of unsealed regions, and unnecessary utilization of epoxy compound.

Figure 5:
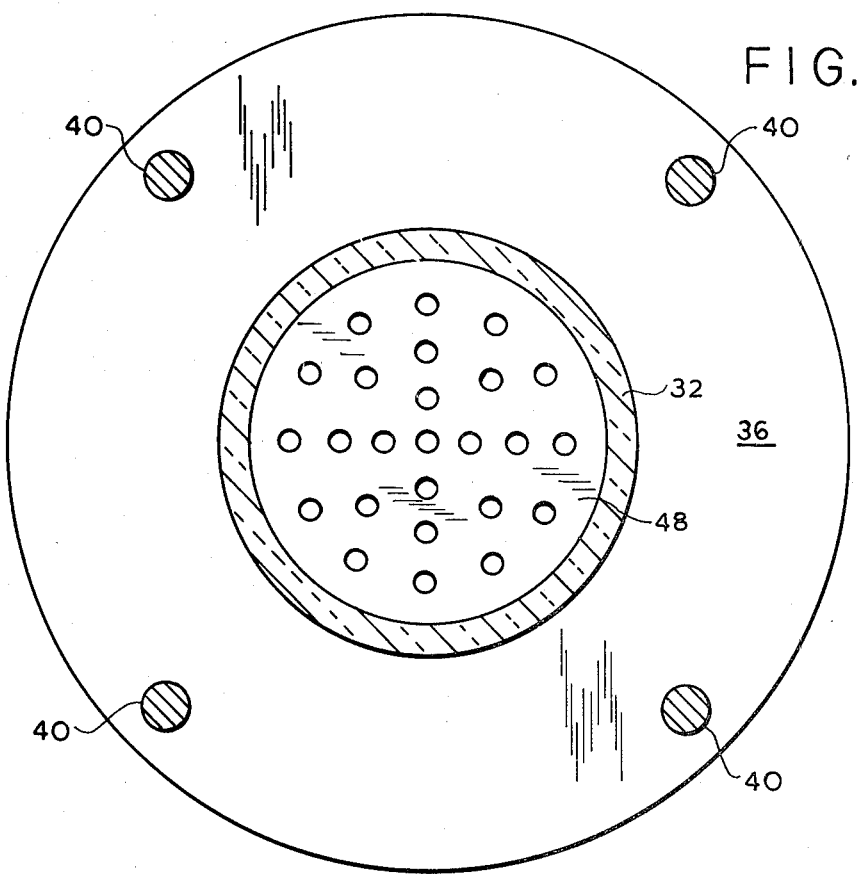
Figure 10:
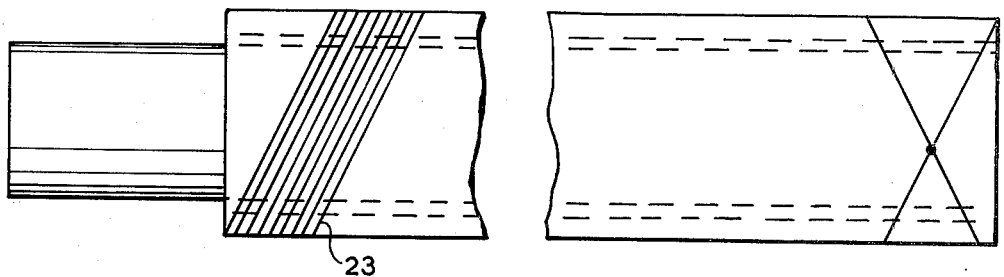
FIGS. 10, 11 and 12 are partially diagrammatic longitudinal segmentary views illustrating the winding respectively of the first, an intermediate and the final or outer wrap in bundle annulus.
Figure 11:
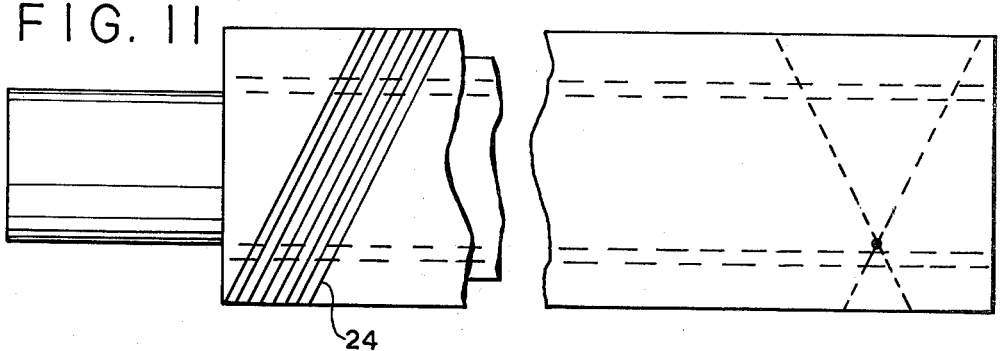
Figure 12:
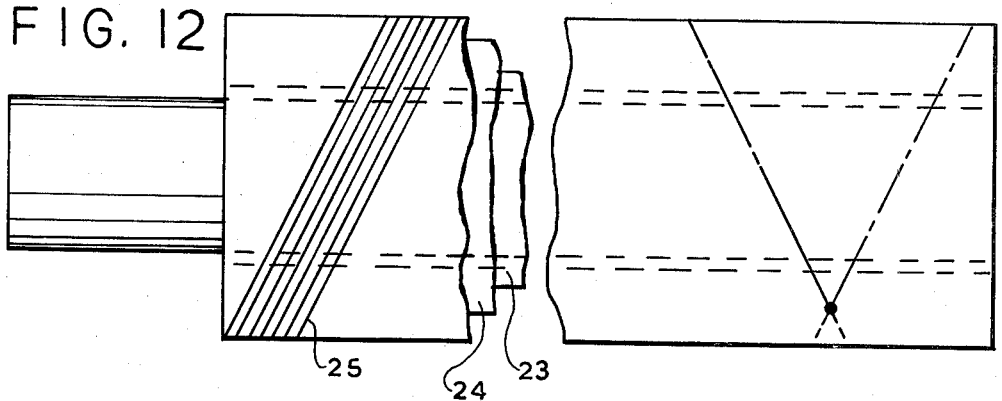
Figure 13:
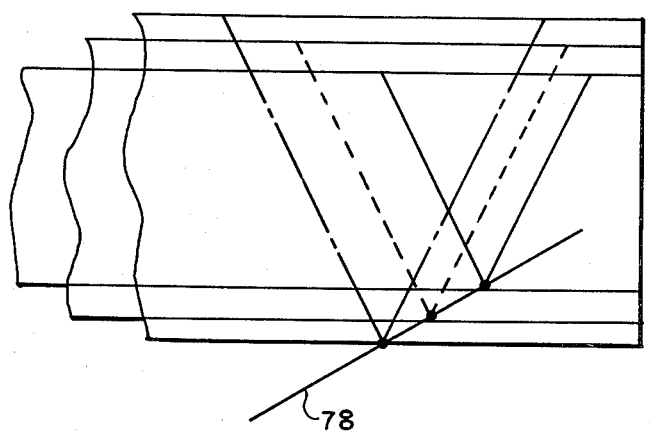
FIG. 13 is a diagrammatic view of inner, outer, and intermediate annulus wrap illustrating the location in each of these wraps where the fiber of the respective wrap crosses the fiber of the previous wrap of layer in the completed bundle.

In the subject invention a ring of rubbery cement as indicated in FIG. 15 by the numeral 70 is applied to the extensible sleeve member on the winding shaft 68 during the winding operation at a position that will correspond ultimately to the upper regions 72 of the potting medium 66 when it is later placed in mold 74 as shown in FIG. 5. Then during the winding of the fibers on first the extensible sleeve and subsequently on top of the preceeding fiber wraps as shown in FIGS. 10–13, a continuous deposit of the same rubbery cement is made at generally the same axial position in the annulus. At the completion of the winding of the entire annulus, there exits with it a substantially doughnut or O-ring barrier membrane or the rubbery cement in the plane generally designated by numeral 70 in FIG. 15 separating the portion of the fibers which will ultimately become imbedded in the potting medium from the remainder of their lengths. In the same sense, the end of inner extensible sleeve member 26a also has the barrier membrane, applied thereto, so that if it too has a capability for inducing capillary migration of the precured potting medium, said capillarity would be obstructed at the same axial point of position.

The completion of the potting operation after winding is illustrated in FIG. 15 with the mold and potting medium designated respectively by the numerals 74 and 66. In many prior art descriptions of the method of securing hollow fiber membranes in a sealing material, recourse is taken to methods of forcing potting compound into the interstices among the fibers by pressure, under vacuum, and by centrifugation. In the present invention such relatively complicated and frequently inadequate methods can be avoided by the use of vibratory energy. The uncured potting compound 66 in mold 74 is subjected to vibration from subsonic to ultrasonic frequencies by a suitable impulsing device, such as a vibrating hammer or ultrasonic transducer, not shown. The fiber bundle 22 is immersed into the mold 74 containing the precured potting compound 66 which, under the urging of the vibratory energy supplied to the mold, tends to migrate within and fill the interstices of the bundle with much greater ease than would have been secured by gravity alone.

After potting the fibers of the annulus must be opened so that permeate within the individual bores thereof can be received and collected in the collection chamber or annular gallery 71 provided in the mold potting compound, for removal through port 50. A feature of the subject invention is to provide that the internal pressure force developed in the module during use and acting against the fiber potting medium 66 is resisted by a surface of the potting 66 in which no fiber ends appear. The numeral 67 in FIG. 2 designates this surface. Additionally the surface 67 of the potting supports the thrust developed by the internal hydraulic pressure acting against the inwardly facing surface of the potting.

In the subject invention ends of fibers which are cut or exposed to provide exit for the permeate flow are in access surfaces within the potting medium at either a different elevation or a different angle than the surface of the potting medium required to take the pressurizing thrust force, or both.

We have found that if a number of angular slices are made into the end of the cylinder of fiber-containing potting, connecting points near the center of surface 69, upwardly, and outwardly with points in the surface 71 of the annular gallery of the potting providing continuous channels connecting surfaces 69 and 71 and providing an apex in the slice along 78 as seen in the Figs., all fibers will have open ends exposed to gallery 76.

Figure 3:
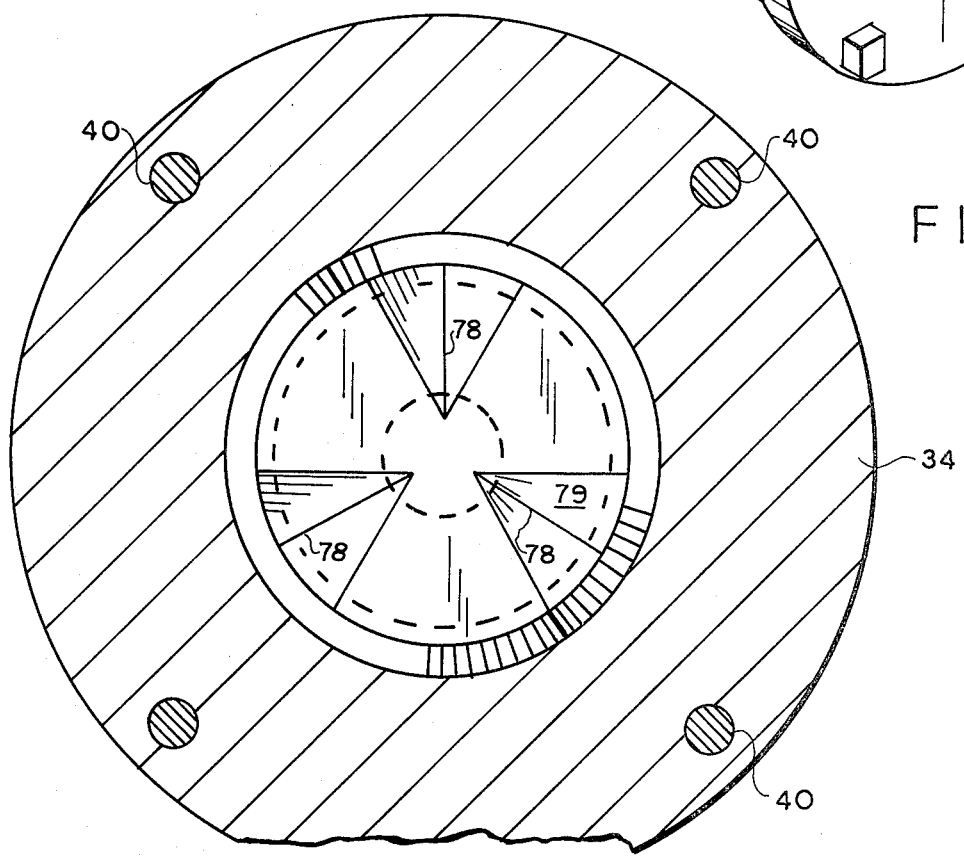
FIGS. 3, 4 and 5 are transverse sectional views taken respectively along the lines 3—3, 4—4 and 5—5 in the direction of the arrows in FIG. 2.
Figure 4:
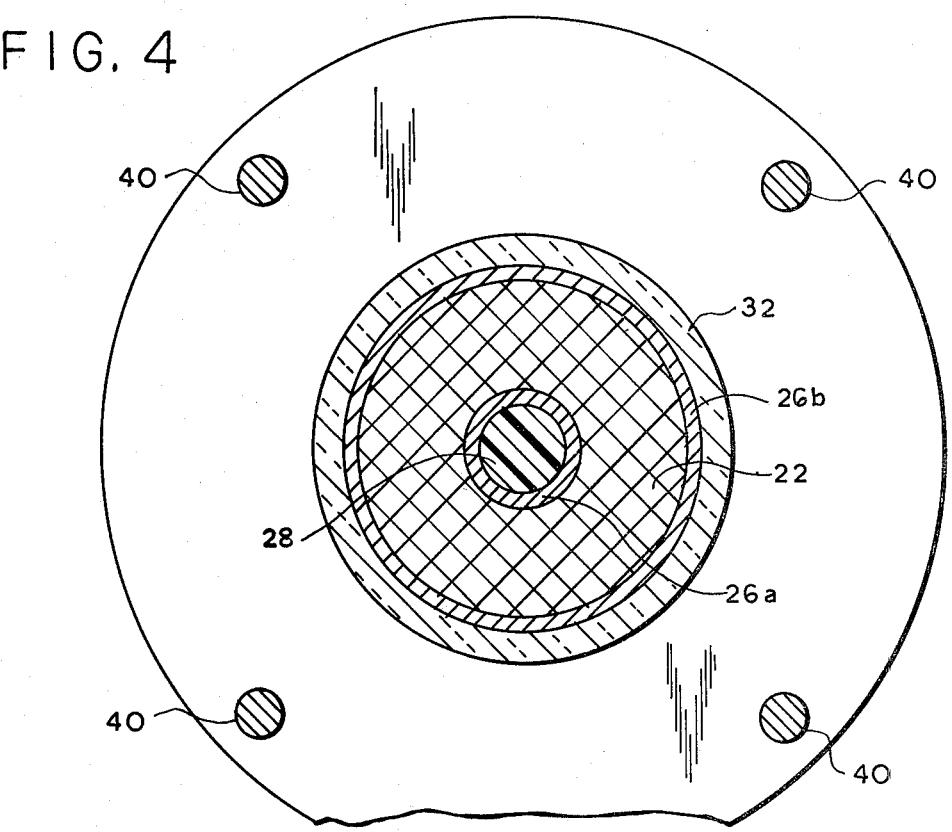

As seen in FIG. 3, the three v-shaped slices comprise six access surfaces, 79, lying at an oblique angle to the base of the potting medium. These access surface planes resulting from the cutting communicate with the annular gallery within the low pressure region of the assembled module, providing thereby ready access to the permeate collection system. The creation of the planes by cutting of the potting medium is accomplished in the preferred embodiment at a time in the curing cycle of the potting medium prior to its final cure. By the selection of a potting compound and control of the time and temperature after immersion of the fiber bundle in the mold, the potting compound achieves a state in which it is readily cut without creation of unwanted detritus to block the fiber openings yet of sufficient resilient integrity to slice cleanly by means of a sharp-edged blade. After cutting, cure of the potting compound is completed by heat and/or the passage of time.

Figure 16:
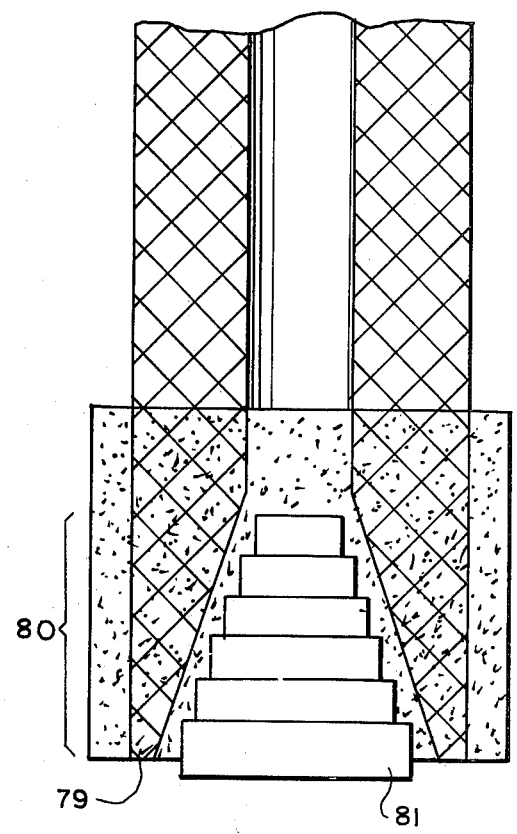
FIG. 16 is a partially sectional view of an alternate embodiment of the invention wherein the fiber access surface planes in the potting medium are obtained in a different manner.

An alternate embodiment of the invention directed toward the creation of cut fiber ends in an access surface plane of the potting medium is shown in FIG. 16. In this example, the fiber helix bundle is wound in such a way that at one end the helix wrapping takes a continuously increasingly steeper angle, forming a conical taper inner surface over a distance indicated by the bracketed length marked "80" in FIG. 16. When this conically tapered end of the annular array of fibers is potted in a mold, it is mounted along with a stepped plug, 81, in such a way that the potting compound encapsulates concurrently the end of the fiber bundle and the plug. After curing, a narrow annular access surface, 79, is machined into the potting compound at an elevation above the support surface provided by the plug.

Figure 17:
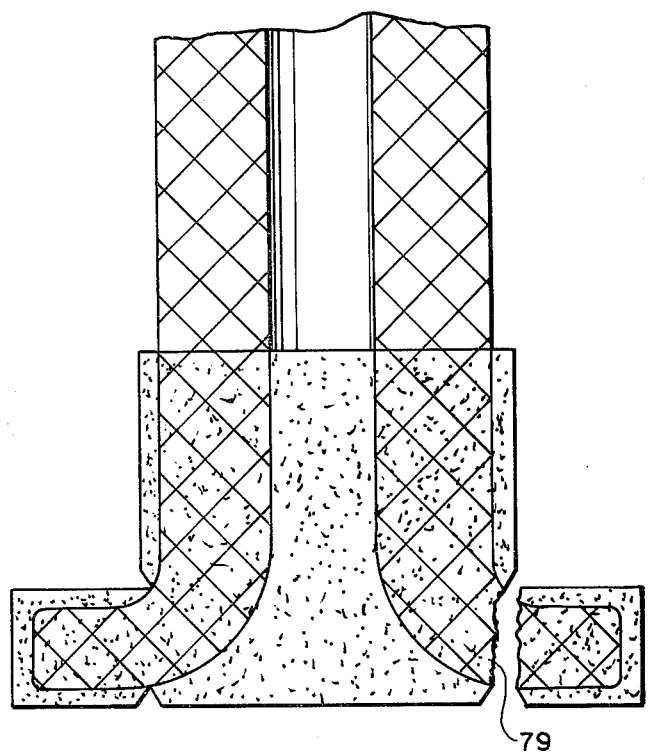
FIG. 17 is a partially sectional view wherein still another method of obtaining fiber access surface planes is shown.
Figure 18:
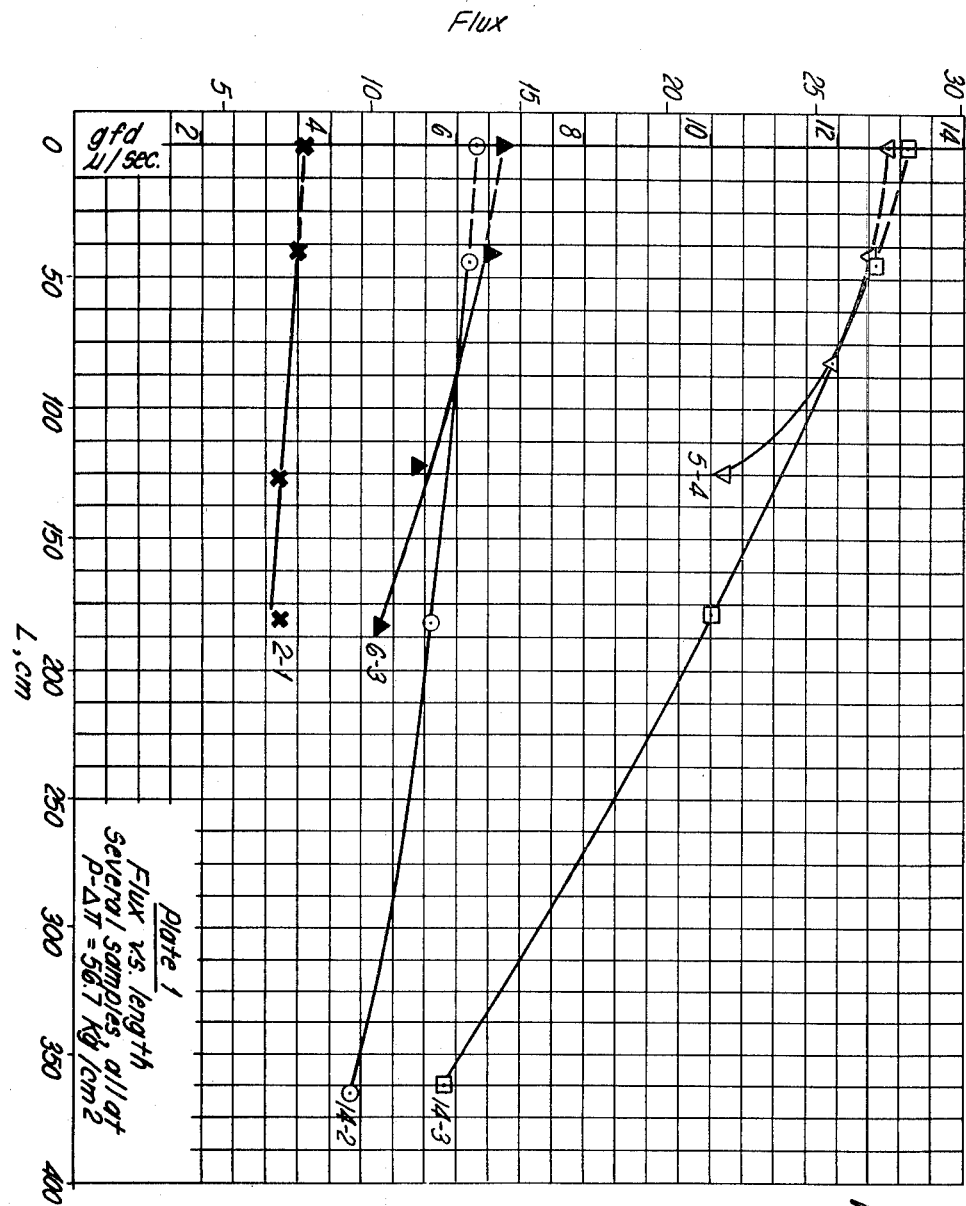
FIG. 18, plate 1 represents a graph of flux vs. length of several samples.
Figure 19:
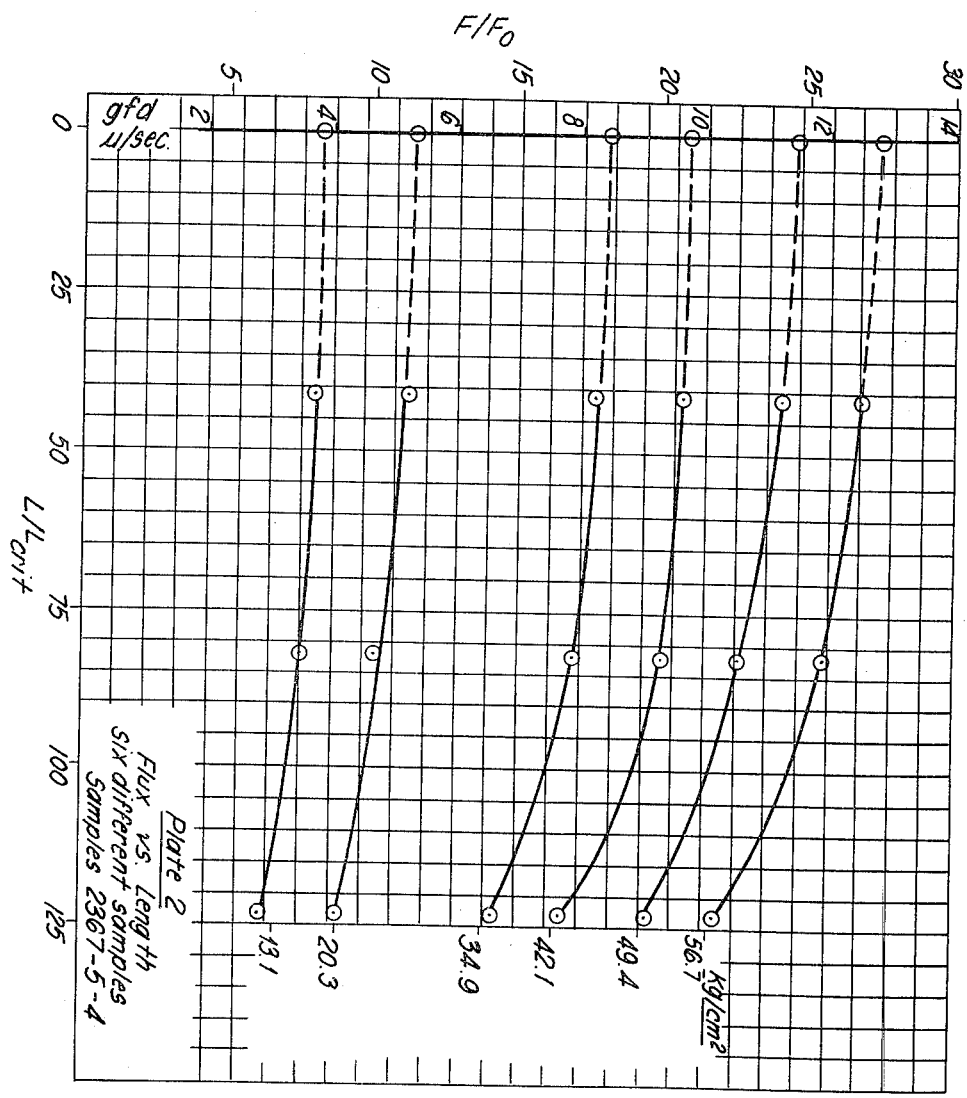
FIG. 19, plate 2 is a graph of flux vs. length of six different samples.
Figure 20:
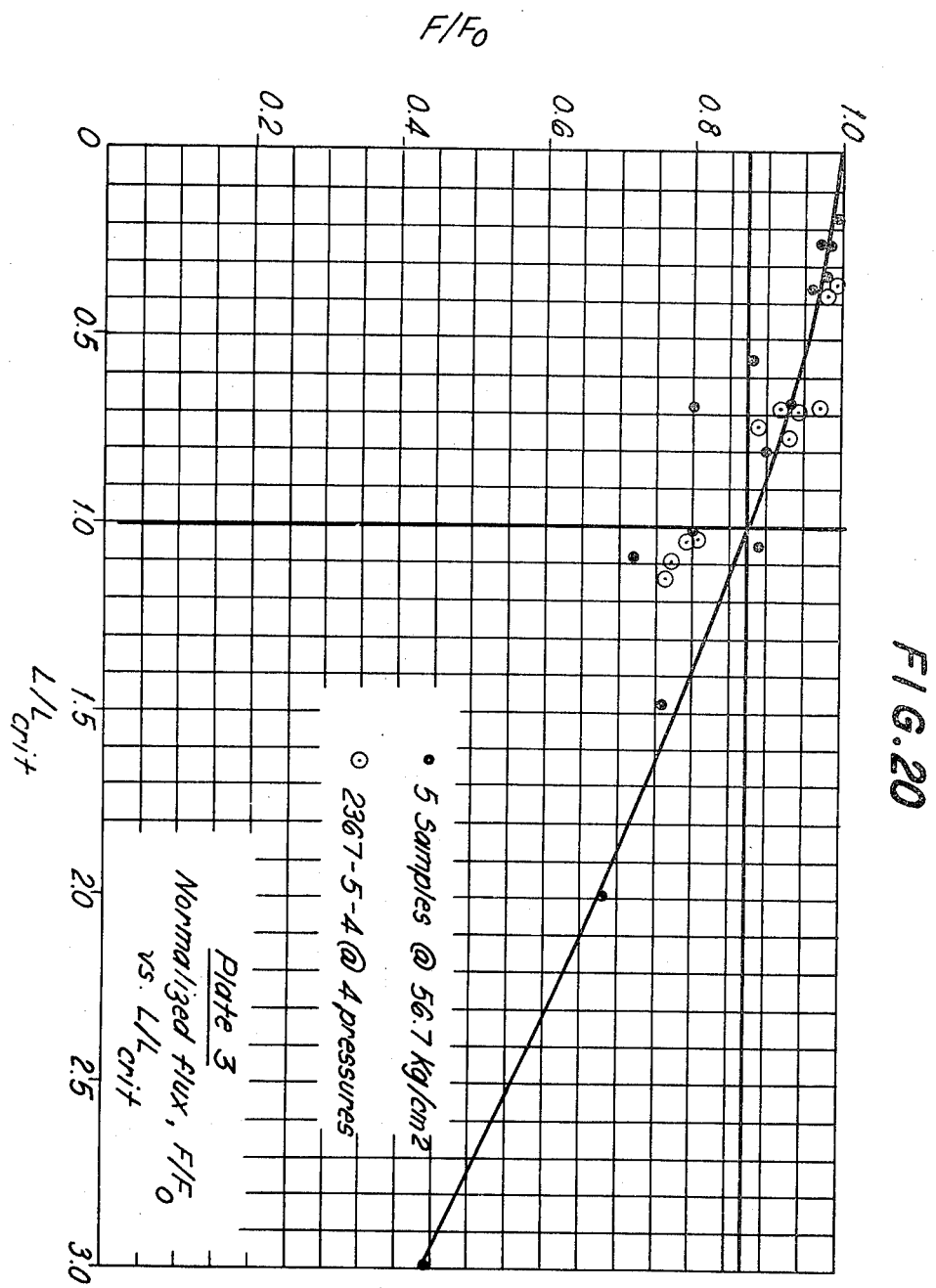
FIG. 20, plate 3, is a graph of normalized flux.
Figure 21:
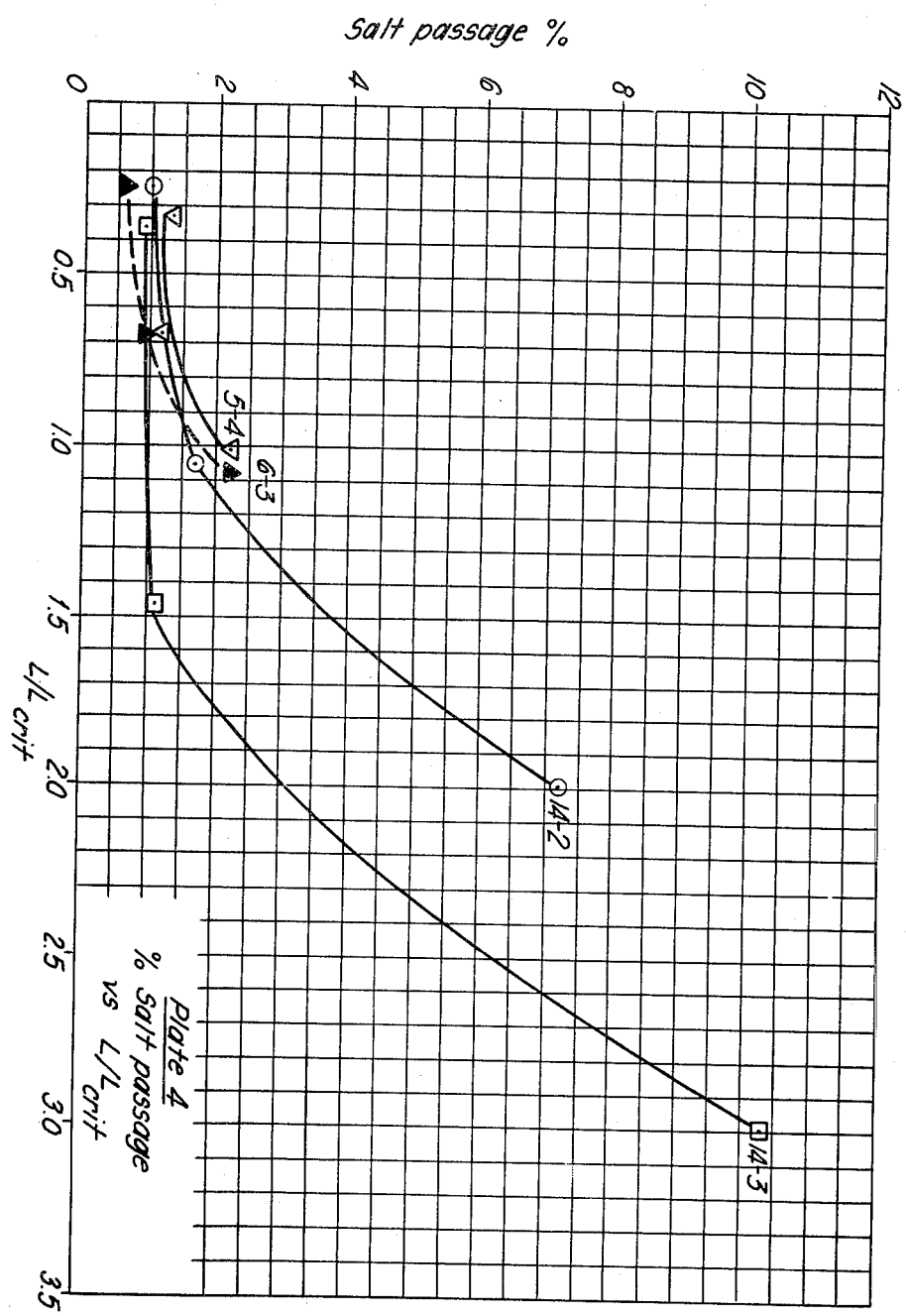
FIG. 21 plate 4 is a graph of Percent salt passage vs. L/L crit.

Still another embodiment of our invention is illustrated by FIG. 17. Here a wound bundle of filaments is prepared having loops at one end extending at right angles to the main axis of the bundle. This can be accomplished, for example, by mounting on the winding mandrel a thin, disklike member several inches larger in diameter than the mandrel. During the winding operation, the traverse of the yarn is carried axially beyond said disk so that there is a section of yarn from each loop of the wind that passes over the extreme edge of the disk before the yarn direction is reversed. The result of such a winding process is to provide at one end of the helically wound bundle a flange-like circular array of fibers whose axes at that point lie generally at right angles to the annulus axis. Later, the entire flange-like circular array of fibers plus an additional region axially inward of said array become the site for the infusion of potting compound. The mold for such an assemblage provides means for creating segments in the potting compound with fibers of the flange-like bundle extension lying in said segments of potting compound. After the full cure of said potting compound, it is possible to create open fiber ends in the fiber lengths lying at right angles to the main axis of the annulus by shearing off the segmented zones of potting compound in which the flange-like array of fibers has been embedded. Thus an access plane, 79, will be created where each such segmented zone of potting compound has been fractured from the body of the pot. Open ends of fibers will again be found in planes lying at some angle, generally at a right angle, to the surface against which the thrust on the potting compound is applied during module operation.

Another feature of the subject invention concerns the sealing of the pressurized concentrate regions of the module separate from the permeate collection regions of the module.

In the subject invention the permeate collection chamber 76 is sealed apart from the pressurized concentrate region of the potting medium by "O"-rings 56 and 58 with weephole 54 additionally protected by O-ring seal 60 to allow any leak of concentrate to exit the module assembly without inadvertently commingling with the permeate. The pressurized concentrate is removed at port 52 which is sealed by O-rings 60 and 62. Although the "O"-rings are hidden during operation of the module, any leakage past them can readily be detected and corrective action taken.

In prior art modules the pressure shell has been a cylindrical chamber in view of the accepted manner of resisting the high hydrostatic pressures. The requirement has been imposed on the shell to accept both the hoop stress loadings and axial loading developed by connections to the end plates. In addition, the end plates were frequently mounted to the shell and connected by snap rings or the like, which carried the thrust on the end plates to shell surface through grooves or some other connective ridges or the like. This required that the shell be of substantial thickness and mechanical integrity in all directions. In the subject invention the stringer bolts 40 secure the two end plates 36 and 38 of the pressure cylinder to one another, thereby eliminating axial stress on the shell. By use of these stress-bearing stringer members, problems associated with connecting end plates to the shell by snap rings and the like are also eliminated. These features allow for simpler fabrication of the shell itself and the assembly and disassembly of the entire system, as well as access to its internal parts.

Thus, among others the aforementioned objects are achieved.

We claim:

1. In a process for the preparation of a hollow filament separatory module comprising a bundle of filaments at one end of which is an encapsulating polymeric mass, the steps of slicing through the polymeric mass to a depth sufficient to intersect fiber loops lying therein at a time in the cure cycle of the polymer before final cure and after sufficient gelation has occurred to permit clean slicing, and thereafter completing the cure of the polymeric mass by the passage of time and the application of heat.

2. The method of producing a hollow filament separatory module including the steps of winding the hollow filaments to produce a fiber bundle and after winding immersing one end of the fiber bundle into potting compound in a mold and supplying vibratory energy to the mold whereby the potting compound migrates to fill the interstices of the bundle and encapsulate the end of the bundle in the potting medium and thereafter cutting through the potting compound to remove portions of the compound to expose the cut fiber ends to provide access to the fiber bores and wherein the cutting within the potting compound is at a time in the curing cycle of the potting compound prior to its final cure and subsequent to sufficient gellation to permit clean slicing, and after cutting completing the cure of the potting compound by the passage of time and the application of heat.

* * * * *

UNITED STATES PATENT AND TRADEMARK OFFICE
CERTIFICATE OF CORRECTION

PATENT NO. : 4,220,489
DATED : September 2, 1980
INVENTOR(S) : MYRON J. COPLAN, JOHN H. BEALE & ROBERT B. DAVIS It is certified that error appears in the above—identified patent and that said Letters Patent is hereby corrected as shown below:

Column 1, after the title, insert the following paragraph --The Government has rights in this invention pursuant to Contract No. 14-34-0001-7508 awarded by the Office of Water Research and Technology of the United States Department of the Interior--.

Signed and Sealed this

Seventeenth Day of May 1983

[SEAL]

*Attest:*

DONALD J. QUIGG

*Attesting Officer*  *Acting Commissioner of Patents and Trademarks*